March 22, 1966  B. A. MORRELL  3,242,460
AUTOMOBILE ALARM SYSTEM
Filed July 10, 1963  2 Sheets-Sheet 1

INVENTOR.
BENJAMIN A. MORRELL
BY
ATTORNEYS

March 22, 1966　　　B. A. MORRELL　　　3,242,460
AUTOMOBILE ALARM SYSTEM
Filed July 10, 1963　　　　　　　　　　　　2 Sheets-Sheet 2
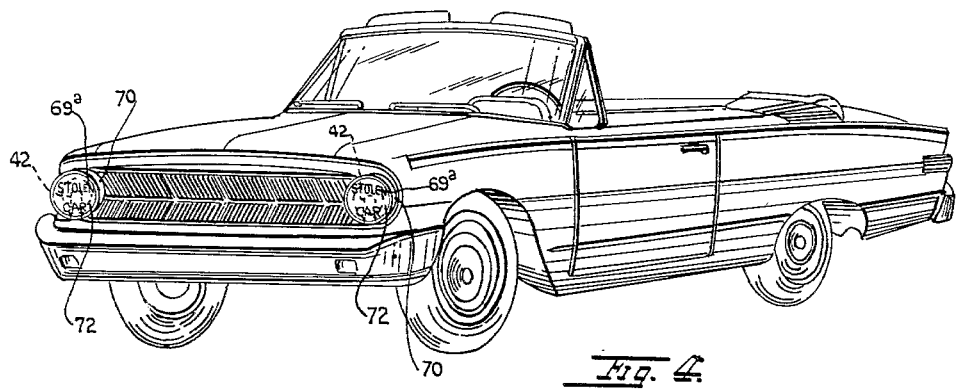
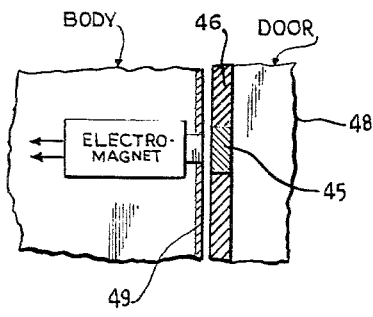
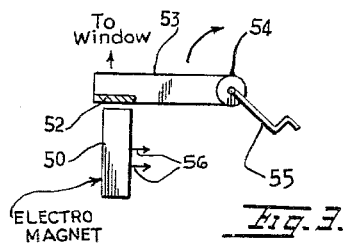
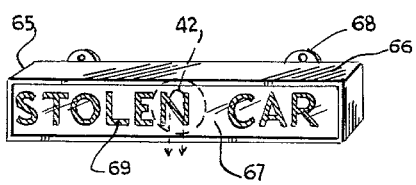
INVENTOR.
BENJAMIN A. MORRELL
BY
*ATTORNEY*

United States Patent Office 3,242,460
Patented Mar. 22, 1966

3,242,460
AUTOMOBILE ALARM SYSTEM
Benjamin A. Morrell, 529 6th Ave., Pelham, N.Y.
Filed July 10, 1963, Ser. No. 294,132
7 Claims. (Cl. 340—64)

This invention relates to automobile alarm and protective systems, and more particularly concerns a system for signaling visually and audibly the theft or attempted theft of an automobile and including means for frustrating the theft and assisting in the capture of the automobile thief.

According to the invention an automobile is provided with signal lamps which light up when an unauthorized person attempts to drive off an automobile equipped with the system embodying the invention. Included in the system are automatic locks which prevent unauthorized opening of doors, windows and hood of the automobile. Further, the system includes time delay means controlling ignition and horns in the automobile for stopping the automobile and for sounding an alarm to frustrate theft of the automobile.

It is therefore a principal object of the invention to provide an automobile with an alarm and protective system for frustrating theft of the automobile. Other objects of the invention are: to provide means to assist in capturing the thief of an automobile while performing the act of theft; to provide means for lighting signal lamps indicating the automobile is being stolen; to provide means for locking doors, windows and hood of the automobile being stolen; to provide time delay means for controlling ignition and horns to frustrate theft of the automobile; and to provide a novel automobile accessory system for frustrating theft of the automobile, which system can be installed in any automobile during or subsequent to manufacture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 2 is a fragmentary sectional view, partially diagrammatic in form, of a door and door lock according to the invention.

FIG. 3 is a diagram of a window lock forming part of the invention.

FIG. 4 is a perspective view of an automobile showing the front signal lamps which may be employed as parts of the invention.

FIG. 5 is a perspective view of another type of signal lamp.

Figure 1:
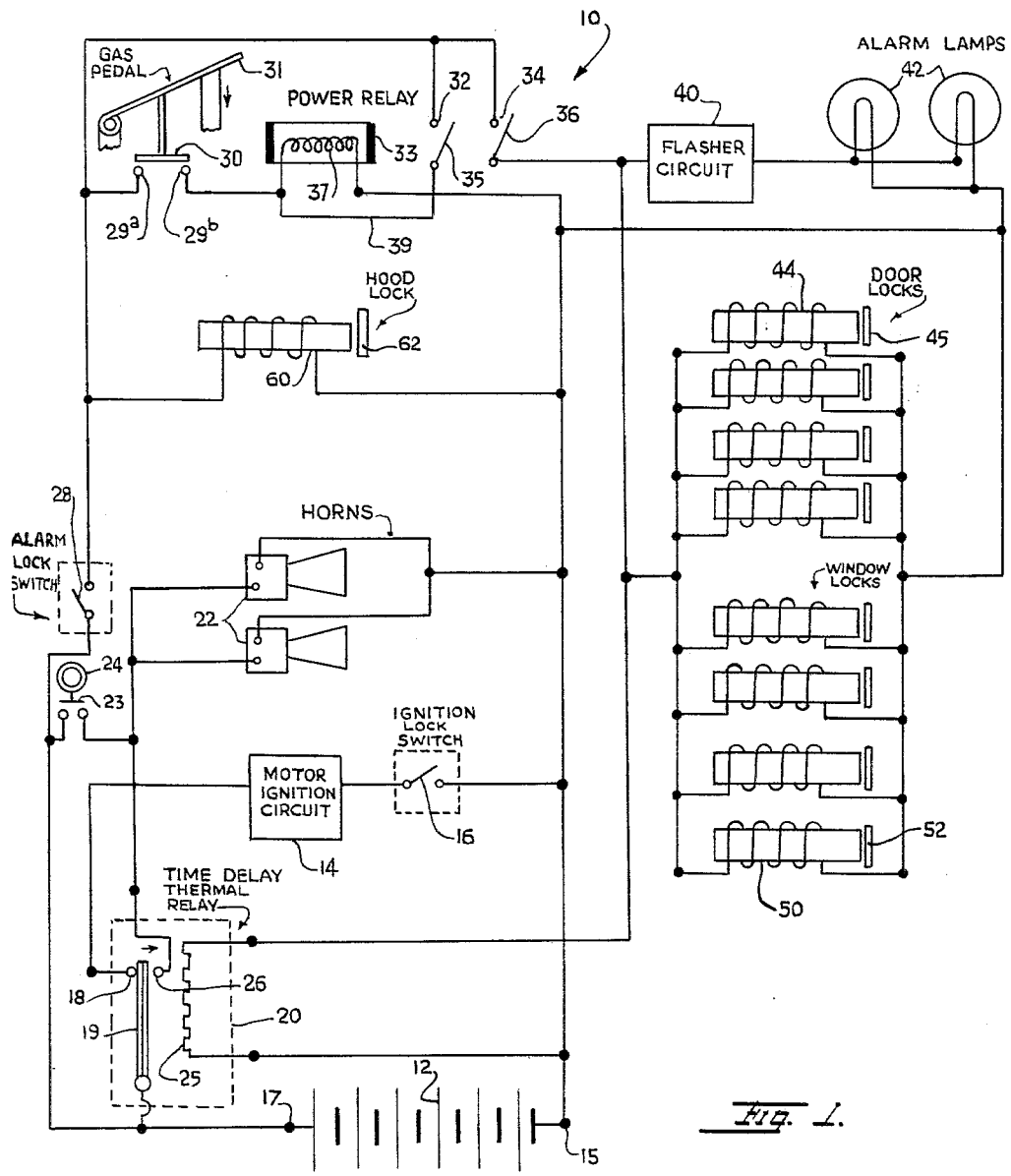
FIG. 1 is a diagram of an automobile alarm and protective system according to the invention.

Referring to the drawings, there is shown diagrammatically, the system 10 including a battery 12. This battery may be the regular battery provided in automobiles. It may be an independent auxiliary battery, or it may be an auxiliary battery connected to the regular battery when the system is activated. The regular motor ignition circuit 14 of the automobile is connected to one terminal 15 of the battery 12 via the usual key controlled lock switch 16. The ignition circuit 14 is connected to the other terminal 17 of the battery via normally closed fixed contact 18 and bimetallic contact 19 of a time delay thermal relay 20.

Horns 22 of the automobile are connected to terminals of the battery via a normally open push-button switch 23 actuated by a ring 24 normally located at the steering wheel of the automobile, as is conventional. In addition, according to the invention, the horns are connected to a fixed contact 26 of relay 20. Contact 26 is normally open with respect to movable bimetallic contact 19 but closes with this contact when the relay is energized.

The system has a single pole switch 28 which may be operated by a key like the ignition lock switch 16. Switch 28 should be located in position inaccessible to passengers inside the automobile. A preferred location for this switch is in the trunk compartment of the automobile located at the front or rear of the automobile body, which compartment is normally closed by a locked trunk door. Switch 28 is connected at one end to terminal 17 of the battery. At the other end switch 28 is connected to fixed contacts 29$^a$, 29$^b$ of a push-button switch 30 operated by the gas or accelerator pedal 31 of the automobile. Switch 28 is also connected to fixed contacts 32 and 34 of an electromagnetic relay 33. The relay has movable contacts 35, 36 normally open with contacts 32, 34, respectively. Contact 35 is connected to one terminal of the relay coil 37 which is connected to contact 29$^b$. The relay coil is connected at one end directly to terminal 15 of the battery. At its other end coil 37 is connected to terminal 17 of the battery via contacts 29$^a$, 29$^b$ and switch 28. Contacts 32, 35 of the relay are connected in a holding circuit 39 with the relay coil 37 so that the coil can be energized when these contacts are closed even though contacts 29$^a$, 29$^b$ are open at switch 30.

Normally open contacts 34, 36 are connected in series with a flasher circuit 40 and lamps 42. The lamps are energized and lighted when switch 28 and contacts 34, 36 are closed. The flasher circuit 40 periodically interrupts the power supplied to the lamps so that the lamps flash on and off. If a steady lighting of the lamps is desired, the flasher circuit may be omitted and the lamps will be connected directly to contact 36.

A first plurality of parallel connected electromagnets 44 are connected at one end to relay contact 36 and at the other end to battery terminal 15. Each electromagnet includes a magnetic plate 45 which may be embedded in the top, bottom or side end 46 of a body door 48 as indicated in FIG. 2. The body of the electromagnet will be located in the body 49 of the automobile. When these electromagnets are energized the plates 45 are held stationary magnetically so that the doors of the automobile cannot be opened in the normal manner. If the automobile has less than four doors, then less than four electromagnets 44 may be provided. If desired, more than one parallel connected electromagnet 44 may be provided for each door.

Another plurality of parallel connected electromagnets 50 are provided for locking the windows of the automobile when the electromagnets are energized. Each electromagnet 50 is to be installed inside the hollow body of an automobile door. A magnetic plate 52 may be secured to operating bar 53 of window opening and closing mechanism 54 indicated in FIG. 3. The mechanism is normally operated by turning crank handle 55 but is locked when electromagnet 50 attracts and holds plate 52. The wires 56 of the electromagnet will be passed through the hinge end of the door into the body of the automobile for connection to battery 12. The electromagnets 44 and 50 are all connected to the battery 12 via switch 28 and contacts 34, 36.

Another electromagnet 60 is connected across the battery via switch 28. This electromagnet operates to hold the hood of the automobile in a closed position by attracting and holding magnetic plate 62 which may be secured to the hood while the electromagnet will be attached to the body, chassis or other fixed part of the automobile covered by the hood.

Relay 20 has a heater element 25 which is connected to terminal 15 of the battery 12 and to contact 36 of relay 33.

Lamps 42 are preferably installed in fixtures such as shown in FIGS. 4 and 5. In FIG. 4, fixture 65 includes a casing 66 provided with brackets 68 for securing the fixture to an end of the automobile. One, two or more such fixtures may be provided at one or both ends of the automobile. On its front face 67, the fixture may bear legend 69 which is illuminated when the lamps 42 are lighted. This legend may read "Stolen Car" or the like to alert policemen, parking lot attendants, and others that an attempt is being made to steal the automobile. This legend may be colored red, green or other attention-getting color.

FIG. 5 shows another lamp fixture 70 which may be a regular head or tail lamp fixture of an automobile. The legend 69a is marked on the lens 72 of the fixture. Alternatively, fixture 70 may be an auxiliary one installed at either end of the automobile or on the roof of the automobile. The legend preferably will be unreadable when the lamp is unlighted. One or more fixtures 70 may be provided at opposite ends, sides and top of the automobile, wherever they will be most conspicuous when lighted and flashing.

In operation of the system 10, an authorized operator, driver or owner of the automobile will open switch 16 to turn off the motor when parking the automobile. He will then close all windows and doors after leaving the automobile. Then he will open the trunk door and close switch 28. This sets the system for operation. When the operator closes and locks the trunk door the switch 28 is concealed. When the operator closes switch 28, the hood lock electromagnet is energized and the hood is held closed, preventing access to the battery 12 and horns 22 normally located under the hood.

Suppose now that an unauthorized person enters the automobile by opening a door or window in some manner. As soon as the unauthorized person steps on the pedal 31 for the purpose of starting the motor, relay 33 will be energized by the closing of switch 30. Contacts 32, 35 and 34, 36 will close. If the unauthorized person then releases the pedal 31, and switch 30 opens, relay 33 will remain energized because coil 37 is now connected in circuit with the battery through closed contacts 32, 35 of the holding circuit 39. When contacts 34, 36 close, lamps 42 are immediately lighted providing visual signals of attempted theft of the automobile. Lamps 42 will flash on and off periodically under control of flasher circuit 40. At the same time all the electromagnets 44 and 50 will be energized so that the windows and doors of the automobile will be held closed magnetically and cannot be opened by ordinary means. The intended thief will thus be retained inside the automobile. At first he will not be aware that the doors, windows and hood are locked closed, and that the signal lamps 42 are lighted giving a theft alarm.

The unauthorized person may attempt to drive off with the automobile and may actually do so. However, during this time the resistive element 20 is being energized and at the end of a predetermined time, of about a minute or so, the time delay relay 20 will become fully energized and contacts 18, 19 will open while contacts 19, 20 close. The opening of contacts 18, 19 opens the ignition circuit of the automobile and the automobile will stop in traffic or wherever it is. The closing of contacts 19, 20 closes the alarm system energizing circuit of horns 22 and these horns will sound continuously to attract attention of law enforcement persons, passing motorists, etc. The intended thief will find himself immediately unable to leave the automobile while the alarm system will be fully operating. Even if the thief should break out of the automobile before he can be apprehended by a police officer or others, he cannot turn off the alarm system and must abandon the automobile. Police authorities or other authorized persons can turn off the alarm system by opening concealed switch 28.

The system thus operates to frustrate the theft of an automobile and assists in capture of the intended thief by restraining him in the locked automobile until he either breaks out of the automobile or is apprehended by lawful authorities. The system can be made up as a kit for installation in existing automobiles or can be installed in an automobile as original equipment at time of manufacture. The system is made up of inexpensive, replaceable parts. It is easily installed. Installers have the option of installing the switch 28 in places other than the trunk of the automobile which may become known to unauthorized persons as the possible location of this switch. It may be under a fender, behind a bumper, or other inconspicuous location. Thus an unauthorized person, by cursory inspection will not detect the presence of the alarm system.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, and an alarm sounder connected to said time delay relay, so that the alarm sounder is actuated continuously at the expiration of said predetermined time while said ignition circuit is opened.

2. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, an alarm sounder connected to said time delay relay, so that the alarm sounder is actuated continuously at the expiration of said predetermined time while said ignition circuit is opened, and a flasher device in series circuit with said alarm lamp means so that the alarm lamp flashes on and off while the alarm lock switch is closed after closure of the actuating switch.

3. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, an alarm sounder connected to said time delay relay, so that the alarm sounder is actuated continuously at the expiration of said predetermined time while said ignition circuit is opened, and a flasher device in series circuit with said alarm lamp means so that the alarm lamp flashes on and off while the alarm lock switch is closed after closure of the actuating switch, said instant acting relay including a holding circuit for keeping the instant acting relay energized while the alarm lock switch is closed after the actuating switch is once closed, so that the alarm lamp means remains flashing even though the actuating switch is thereafter opened.

4. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, an alarm sounder connected to said time delay relay, so that the alarm sounder is actuated continuously at the expiration of said predetermined time while said ignition circuit is opened, and a flasher device in series circuit with said alarm lamp means so that the alarm lamp flashes on and off while the alarm lock switch is closed after closure of the actuating switch, an electromagnet connected in circuit with said alarm lock switch and said battery, said electromagnet being disposed to hold closed the hood of the automobile when said alarm lock switch is closed.

5. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, an alarm sounder connected to said time delay relay, so that the alarm sounder is actuated continuously at the expiration of said predetermined time while said ignition circuit is opened, and a flasher device in series circuit with said alarm lamp means so that the alarm lamp flashes on and off while the alarm lock switch is closed after closure of the actuating switch, a plurality of electromagnets in circuit with said instant acting relay, said electromagnets being disposed at doors and windows of said automobile for holding said doors and windows closed while alarm lock switch is closed after said instant acting relay is actuated.

6. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, an alarm sounder connected to said time delay relay, so that the alarm sounder is actuated continuously at the expiration of said predetermined time while said ignition circuit is opened, and a flasher device in series circuit with said alarm lamp means so that the alarm lamp flashes on and off while the alarm lock switch is closed after closure of the actuating switch, said instant acting relay including a holding circuit for keeping the instant acting relay energized while the alarm lock switch is closed after the actuating switch is once closed, so that the alarm lamp means remains flashing even though the actuating switch is thereafter opened, a plurality of electromagnets in circuit with said instant acting relay, said electromagnets being disposed at doors and windows of said automobile for holding said doors and windows closed while the alarm lock switch is closed after said instant acting relay is actuated.

7. An automobile alarm and protective system, comprising a battery, an alarm circuit including alarm lamp means, an instant acting relay and an actuating switch connected to the battery, an alarm lock switch in series with said circuit for setting said circuit for operation whereby said alarm lamp means light up when said actuating switch is closed while the alarm lock switch is closed, a time delay relay connected in circuit with said instant acting relay, a motor ignition circuit normally closed through said time delay relay and opening when said time delay relay is operated, so that said ignition circuit is opened and ignition is cut off at the expiration of a predetermined time following actuation of the instant acting relay, an alarm sounder connected to said time delay relay, so that the alarm sounder is actuated continuously at the expiration of said predetermined time while said ignition circuit is opened, and a flasher device in series circuit with said alarm lamp means so that the alarm lamp flashes on and off while the alarm lock switch is closed after closure of the actuating switch, said instant acting relay including a holding circuit for keeping the instant acting relay energized while the alarm lock switch is closed after the actuating switch is once closed, so that the alarm lamp means remains flashing even though the actuating switch is thereafter opened, a plurality of electromagnets in circuit with said instant acting relay, said electromagnets being disposed at doors and windows of said automobile for holding said doors and windows closed while the alarm lock switch is closed after said instant acting relay is actuated, and another electromagnet connected in circuit with said alarm lock switch and said battery, said other electromagnet being disposed to hold closed the hood of the automobile when said alarm lock switch is closed.

References Cited by the Examiner
UNITED STATES PATENTS

| | | | |
|---|---|---|---|
| 2,453,903 | 11/1948 | Grey | 340—63 |
| 2,729,806 | 1/1956 | Dewhirst | 340—60 XR |
| 2,839,736 | 6/1958 | Tinsley et al. | 340—63 |
| 2,892,181 | 6/1959 | Benson et al. | 340—64 |

NEIL C. READ, *Primary Examiner.*

THOMAS B. HABECKER, *Examiner.*